Sept. 21, 1943.    B. R. GRANBERG ET AL    2,329,756
INDEXABLE SUPPORT
Filed Sept. 6, 1941    3 Sheets-Sheet 3

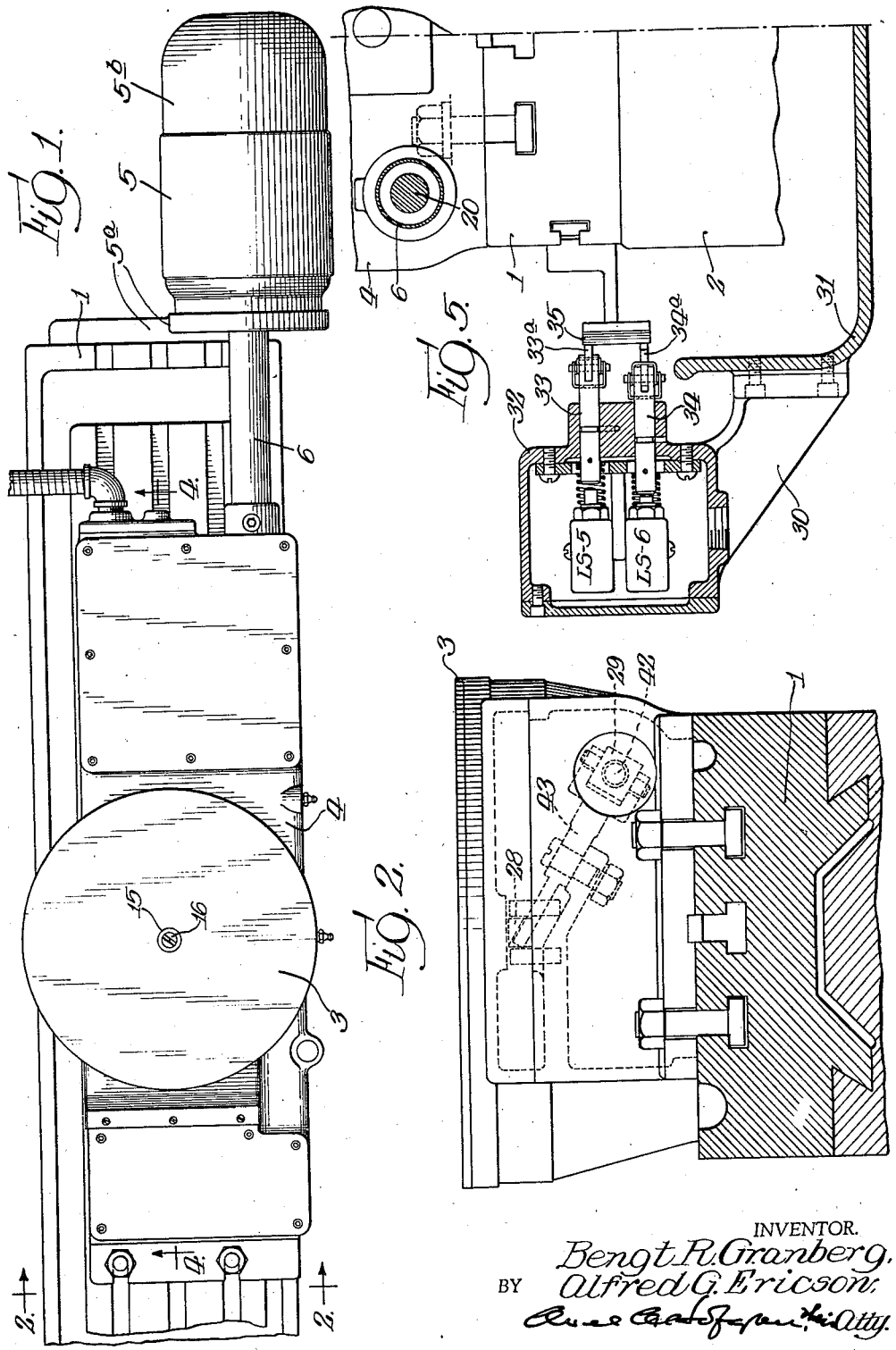

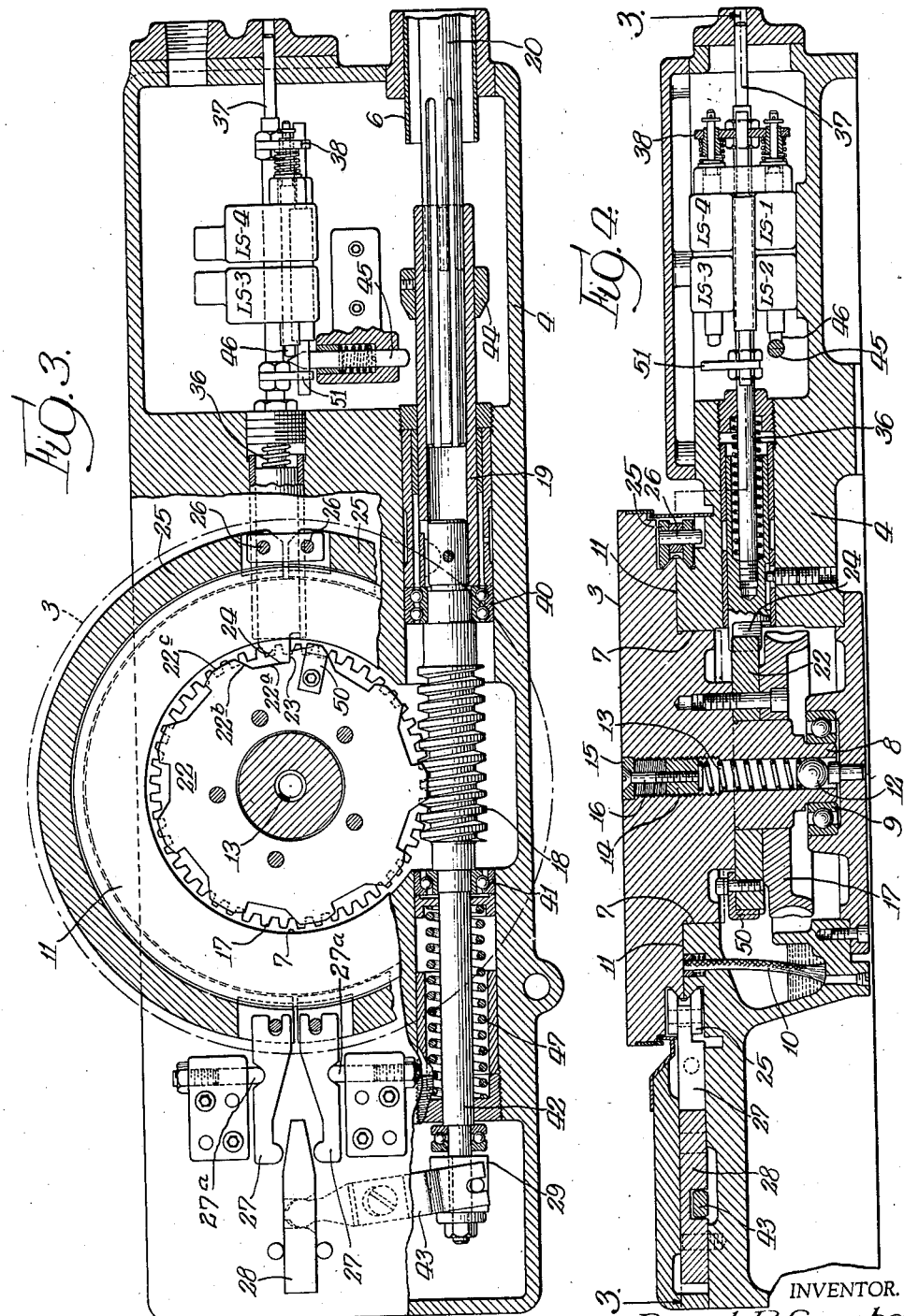

INVENTOR.
Bengt R. Granberg.
Alfred G. Ericson.
BY

Patented Sept. 21, 1943

2,329,756

UNITED STATES PATENT OFFICE 2,329,756

INDEXABLE SUPPORT

Bengt R. Granberg and Alfred G. Ericson, Rockford, Ill., assignors to Sunstrand Machine Tool Co., Rockford, Ill., a corporation of Illinois Application September 6, 1941, Serial No. 409,856

17 Claims. (Cl. 90—56)

This invention relates to a rotatable support for use on machine tools, and it is illustrated in the form of a work support applicable to a milling machine or the like; but the features of the invention are equally suitable for use in the operation of a tool turret such as that employed on a production lathe or automatic screw machine.

One object of the invention is to provide a rotatable support with indexing mechanism operable intermittently to shift the support from one station to the next and including locking means which is releasable with a minimum of effort when the support is to be moved.

Another object of the invention is to provide an indexable support with a reversible motor for shifting it from one station to the next, and with a cooperating cam and locking plunger serving to define its indexing positions together with switching means controlling the motor and actuated by movements of the locking plunger.

A further object of the invention is to provide a rotatable support with indexing mechanism which includes a positive stop defining each station, a drive motor and a yieldable drive connection by which it shifts the support against the stop and which permits a limited over-drive for shutting off the motor.

It is also an object of the invention to provide a rotatable indexable support, having indexing positions defined by the engagement of substantially radial cooperating surfaces with means yieldingly pressing the surfaces into such engagement and braking means maintaining it, so that upon release of the braking means the rotation of the support may be resumed upon the mere separation of the stop surfaces and without the forcible withdrawal of a locking member.

And it is also an object of the invention to provide a rotatable indexable support having a stop shoulder and a movable stop member engageable with the shoulder at indexing position, together with a driving motor and drive connections which include a shiftable member with means yieldingly holding it in normal position and control means which cause the motor to first drive the support past indexing position, then to reverse it to bring the stop shoulder into engagement with the stop member, and then, by continued operation, to forcibly move the shiftable drive member, thereby applying the force of its yielding holding means in a direction to maintain the engagement of the stop elements.

Other objects and advantages of the invention will appear from the following description taken in connection with the accompanying drawings in which:

Figure 1 is a plan view of a portion of the machine tool head with a rotatable support embodying this invention mounted thereon.

Figure 2 is a transverse vertical section on a larger scale, taken as indicated at line 2—2 of Figure 1.

Figure 3 is a plan section taken principally as indicated at line 3—3 on Figure 4 and showing the indexing mechanism for the rotatable support.

Figure 4 is a longitudinal vertical section taken substantially as indicated at line 4—4 on Figure 1.

Figure 5 is a vertical detail section taken transversely of the machine table to show certain switches which cooperate therewith to control the operation of the rotatable support.

Figure 6:
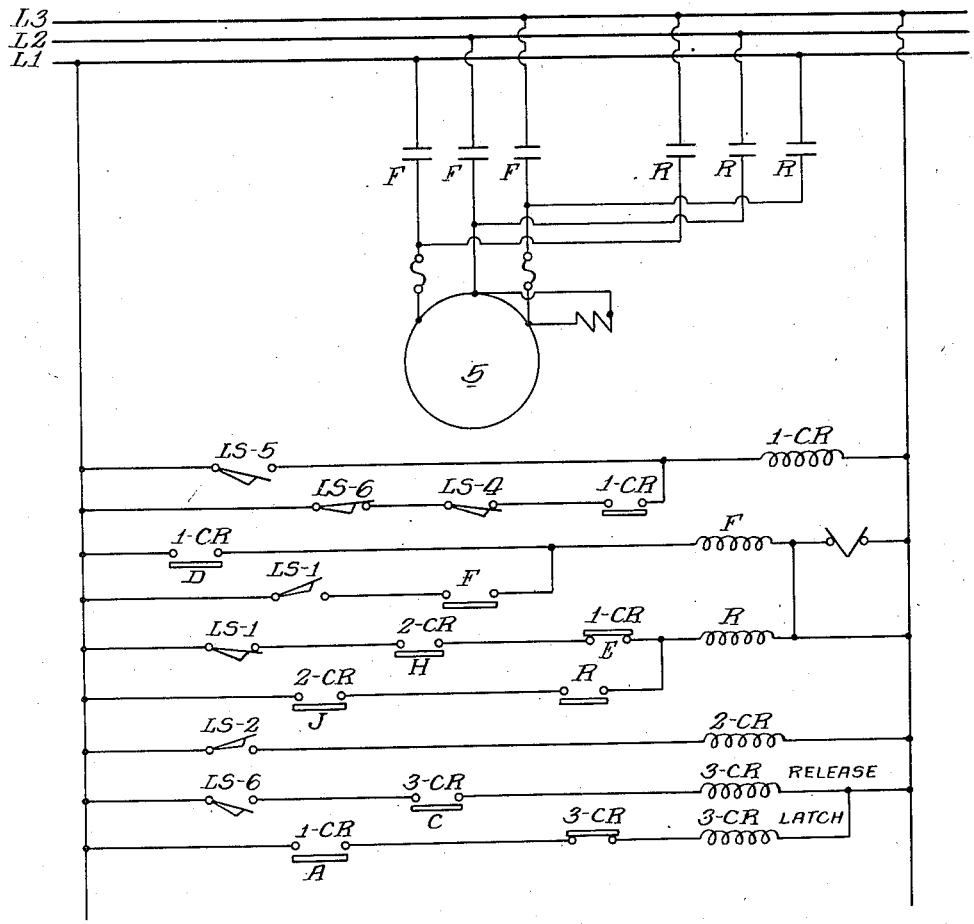
Figure 6 is a diagrammatic view of the electrical control circuit for the indexing motor.

Although there is shown in the drawings and described in detail herein, a single form of the invention, it is not intended to limit the invention to the particular form shown, but rather to cover all modifications and alternative constructions coming within the scope of the claims.

In the drawings the table of a milling machine is indicated at 1, mounted for reciprocation on the machine bed 2 and carrying a fixture which includes the rotatable base or support 3 which is the subject of this invention. A frame or body 4 provides a suitable mounting for the support 3 and houses the indexing mechanism therefor, while an electric motor 5 is shown in Figure 1 as supported on the table 1 by means of a special mounting bracket 5ª and provided with a guard tube 6 enclosing its shaft. It may be understood that the circular base or support 3 will be suitably formed or equipped for carrying any desired work holding devices or that when the mechanism is adapted for use as a tool turret it will be equipped with suitable tool holding fixtures; but to simplify the disclosure such equipment is omitted from the drawings. The part 3 is rotatably journaled in the frame 4 at 7, and its reduced central stem 8 is provided with an annular ball bearing 9. A lubricating wick device is shown at 10 for the flat bearing surfaces at 11, and to reduce the friction between these surfaces when indexing takes place, the load on these surfaces is largely relieved by means of a ball thrust bearing 12 to which the weight of the base or table 3 is transmitted by a spring 13 reacting between the ball 12 and a plug 14 screwed into a central opening in the base 3. Adjustment of the plug 14 thus determines the preloading of the spring 13 and ball 12. The upper end of the central opening is counterbored to seat a washer 15 on a screw 16 which is threaded into the plug 14 and acts to lock it frictionally when the plug has been adjusted to give the spring 13 the desired tension.

Between the bearing 7 and the bearing 9 the reduced stem of the support 3 carries a worm gear 17 fixed thereon and meshing with a driving worm 18 coupled to a shaft 19 which has a splined connection with the drive shaft 20 of the motor 5. Adjacent the gear 17 there is also fixed to the rotatable support 3 a cam plate 22 having a plurality of substantially radial stop shoulders 23 which cooperate with a plunger 24 to determine the several indexing positions or stations at which the support 3 will be arrested to permit the machine to operate upon the work piece or pieces carried by the support. In addition, the support 3 is provided with a holding brake which includes a pair of substantially semi-circular clamp shoes 25, 25 connected together by pivots 26, 26 and arranged for contraction about a circular portion of the base or table 3 below its upper surface and by means of a pair of levers 27 and a tapered plunger 28, operable as hereinafter described.

In the structure shown in may be assumed that the milling machine table 1 has a reciprocatory cycle of operation which includes a rapid approach to working position with a slower feeding movement and a rapid return travel. Mounted at one side of the path of travel of the table 1, and supported as shown in Figure 5 on a bracket 30 secured to the under pan 31 of the machine bed, is a housing 32 containing control switches LS—5 and LS—6, with operating plungers 33 and 34 respectively. Each of these plungers has a hinged terminal dog, as shown at 33ᵃ and 34ᵃ; and both dogs are provided with springs holding them normally extended for actuation by a trip member 35 carried by the machine table 1; but one dog is arranged to yield about its hinge when engaged by the member 35 traveling in one direction, while the other dog is designed to yield when contacted by the member 35 traveling in the opposite direction. In the return travel of the table 1 after the work on the base 3 clears the cutter or cutters of the milling machine, the trip member 35 actuates the plunger 33 of the switch LS—5, which is thus closed momentarily to energize a suitable relay circuit for starting the motor 5. This rotates the worm 18 and turns the gear 17 and the base or support 3 in a direction to move the shoulder 23 of the cam plate 22 away from the stop plunger 24, the cam plate 22 turning in clockwise direction, as viewed in Figure 3. The plunger 24, being pressed against the periphery of the cam 22 by a follower spring 36, rides upon the low portion or delay surface 22ᵃ of the cam until the adjoining inclined portion 22ᵇ shifts the plunger 24 to the right, and the high portion 22ᶜ then holds it in retracted position as the base 3 continues to turn.

As the next radial shoulder 23 of the cam plate 22 comes into alignment with the locking face of the plunger 24 and passes it, the spring 36 of the plunger drives it past the shoulder 23 against the adjacent delay surface 22ᵃ. This movement of the plunger 24 toward the rotatable support 3 actuates a control rod 37 attached to the plunger and causes a cross-bar 38 on the rod 37 to close a limit switch LS—1. Through suitable circuit connections this has the effect of reversing the motor 5 so that although during this readjustment of the electrical circuits the cam 22 and support 3 may have turned a few degrees beyond indexing position, they will now travel in reverse direction until the stop shoulder 23 collides with the face of the plunger 24, arresting and locking the support 3 at this position.

The locking is perfected by the continued rotation of the motor 5, shaft 19 and worm 18 which is permitted by the splined connection between the shaft 19 and the motor shaft 20, and also by virtue of the fact that the bearings 40 and 41, which carry the worm 18, are slidably mounted for movement in the direction of the axis of the worm, so that when the support 3 is locked, and the worm wheel 17 is thus held against rotation, the motor feeds the worm 18 longitudinally. This shifts the reduced portion 42 of the worm shaft, and the collar 29 carried thereby, in a direction to rock the lever 43 connected to the collar. The lever 43 forces tapered plunger 28 into position with the parallel portions of its lateral surfaces between the lever arms 27 for applying the clamp shoes 25 to hold the base 3 firmly at locked position. The clamping pressure is determined by adjustment of the pins 27ᵃ on which the levers 27 are fulcrumed. The final portion of this longitudinal movement of the worm 18 and its connected shaft 19 brings a beveled collar 44 on shaft 19 into engagement with a transversely movable plunger 45, having a tapered end which engages the projecting stem 46 of the limit switch LS—2 and thus moves the switch to a position at which it energizes a suitable relay for stopping the motor 5. The rotatable support or base 3 then remains stationary at indexed and locked position. Meanwhile, the machine table 1 has completed its rapid return and its rapid approach movements and now proceeds with its slower working feed movement while the milling cutter or cutters operate upon the work carried by the base 3.

It will be noted that from the movement when reverse rotation of the cam plate 22 and support 3 brings the shoulder 23 into engagement with the cooperating face of the stop plunger 24, a torque is exerted upon the worm gear 17 to maintain this engagement. The continued rotation of the worm 18 after the worm gear 17 has been reset is accomplished in opposition to the spring 47, and as the spring is compressed by the longitudinal travel of the worm 18 and its thrust bearing 41, the force of the spring 47 reacts through the worm gear 17 to hold the stop shoulder 23 firmly in engagement with the plunger 24. Then, finally, this holding pressure is supplemented by the definite locking action of the clamp shoes 25.

When the working portion of the table cycle is completed, its direction is reversed in the usual manner, and when it has traveled in reverse direction far enough to withdraw the cutter or cutters from the work, the trip member 35 on the table 1 again actuates the limit switch LS—5, which starts the motor 5, and the indexing cycle is repeated to shift the support to its next station.

Since the limit switch LS—5 is of the normally open type, and remains closed only during engagement with the trip member 35, a holding circuit is established through switches LS—4 and LS—6 so that the motor 5 may continue to run and the indexing cycle may proceed after the table 1 has passed and released the switch LS—5. The initial movement of the motor withdraws the cam collar 44 from plunger 45 and permits the switch LS—2 to return to its normal position while, at the same time, the worm 18 is fed back from its shifted position with the spring 47 following up the movement and returning the bearing 41 to its normal position, and with the lever 43 withdrawing plunger 28 to release the clamp shoes 25. Thereupon, the base or support 3 is rotated by the worm 18 in clockwise direction toward its next indexing position. Thus the base 3 is shifted from its locked position by merely moving a locking shoulder 23 of the cam 22 away from the face of the locking plunger 24 without withdrawing the plunger and without the forcible withdrawal of any other locking member involving frictional resistance or uncertainty of action as when a locking bolt is employed to hold the base at indexed position.

In addition to the cam faces 22$^b$ and 22$^c$, the plate 22 is provided at one point with a supplemental applied cam member 50, projecting radially a little farther than the face 22$^c$ so that when the base 3 has made one complete revolution this cam member 50 engages the end of the plunger 24 and shifts the plunger somewhat farther than it is moved by the other cam faces. This causes a dog 51, carried by the rod 37, to actuate the limit switch LS—3, which serves through suitable circuit connections to stop the movement of the table 1, thus affording the attendant an opportunity of removing the completed work from the base 3 and replacing it with a new work piece or pieces to be operated upon by the milling cutters. The cycle is again started when the operator presses a starting button (not shown).

As will be understood from the foregoing description, the proper coordination and timing of the several movements composing the indexing cycle is insured by the electrical devices and circuits employed. The line diagram of Figure 6 shows all electrical contacts as they are when the rotatable base or support is positioned at an indexing station and locked. The cycle of the milling machine table 1 consists of a rapid approach, a slower working feed, and a rapid return movement. During the return, when the work clears the cutters, the switch LS—5 is closed momentarily by engagement of its hinged dog 33$^a$ with trip member 35 on the table 1. This energizes relay 1—CR. This relay has a holding circuit through LS—4 and LS—6. Contact A of relay 1—CR energizes a latching coil on relay 2—CR, which holds this relay in position with its contacts B and C closed. With contact B closed, the table 1 can continue to travel, regardless of the position of the index base 3.

Energizing relay 1—CR also closes contact D and opens contact E. With E open and D closed, contactor F is energized, which starts index motor 5 forward, in the direction for rotating the index base 3 toward its next station. When motor 5 starts in forward direction, the longitudinal shifting of worm 18 (which occurs before the base 3 begins to rotate) allows LS—2 to close, thereby energizing relay 2—CR, which opens its contact G and closes its contacts H and J.

When the worm 18 has shifted, the base 3 begins to turn, and the plunger 24 is cammed outwardly so that the resulting movement of its cross-bar 38 shifts LS—1 to the position at which it provides a holding circuit for contactor F. Further movement of cross-bar 38 shifts LS—4 to position at which it deenergizes the relay 1—CR.

When the index base 3 reaches its next station the plunger 24 slips past the shoulder 23 of cam 22, thereby reclosing LS—1 and LS—4. LS—1 opens contactor F and also closes contactor R through contacts H on relay 2—CR and E on relay 1—CR. The opening of contactor F and closing of contactor R reverses the motor 5 and drives the index base 3 in reverse direction until its stop shoulder 23 strikes the plunger 24. The floating worm 18 then shifts and sets the clamps 25, 25. Shifting of worm 18 also opens LS—2, deenergizing relay 2—CR. This opens contacts J and H, which deenergizes contactor R, thereby stopping the motor 5. Deenergizing relay 2—CR also closes contact G. This completes the indexing cycle.

Figure 7:
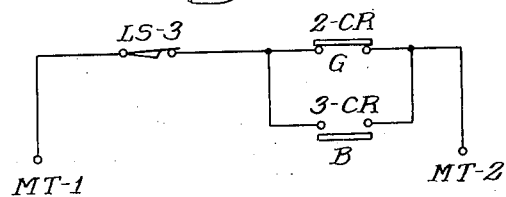
Figure 7 is a partial circuit diagram showing an arrangement for electrical interlocking between the machine table drive and the indexing drive.

It will be remembered that while the indexing is taking place, the table 1 completes its rapid return movement, then reverses and approaches the work. As a safety feature, the hinged dog 34$^a$ of switch LS—6 is positioned to be engaged by the trip member 35 on the table 1 just before the work is reached. The momentary closing of LS—6 energizes the release coil of relay 3—CR, which opens contacts B on 3—CR. If the indexing cycle has been properly completed so that contact G on relay 2—CR has re-closed, the table 1 can continue its travel and feed the work to the cutters. But if the indexing has not been completed, as would be indicated if contact G were open, then the milling machine table 1 will stop, since contacts B and G, being both open at the same time, open the circuit of the motor which drives the table 1. This interlocking of the machine table drive circuit with the indexing circuit is indicated in the fragmentary diagram of Figure 7, in which MT—1 and MT—2 may be understood as terminals to be connected into the circuit which controls the motor by which the milling machine table 1 is reciprocated.

If the table cycle is not thus interrupted the table continues its reciprocation and the indexing cycle of the support or base 3 is repeated until the base has turned through 360 degrees when switch LS—3 is opened momentarily by cam member 50, thereby stopping the table 1, as already described.

Preferably the indexing motor 5 is equipped with a solenoid brake which may be housed in an extension 5$^b$ of the motor casing, and which will insure prompt response of the motor to the control switches governing the indexing cycle.

We claim as our invention:

1. A mechanism comprising a rotatable support and indexing means therefor including a driving motor, a yielding drive connection therefrom to the support, a stop shoulder on the support, a stop member engageable therewith, clamp means for the support, and means operable by the yielding drive connection to apply the clamp after the said stop shoulder has been fed against the stop.

2. A mechanism comprising a rotatable support and indexing means therefor including a driving motor, a yielding drive connection therefrom to the support, a stop shoulder on the support, a stop member engageable therewith, clamp means for the support, and means operable by the yielding drive connection to apply the clamp after the said stop shoulder has been fed against the stop, reversal of the driving motor serving to release the clamp and feed the rotatable support away from the stop.

3. A mechanism comprising a rotatable support, a reversible driving member, means connecting the driving member and support for rotation, means operable for producing a forward movement of said member and support, means controlled by the forward movement of the support and operating to reverse the direction of movement of the support and driving member, stop means limiting the retrograde movement of said support, and clamp means operable by the continued reverse movement of said driving member to hold the support in engagement with the stop means.

4. A mechanism comprising a rotatable support, a reversible driving member, means connecting the driving member and support for rotation, means operable for producing a forward movement of said member and support, means controlled by the forward movement of the support and operating to reverse the direction of movement of the support and driving member, stop means limiting the retrograde movement of said support, yielding means normally positioning the driving member and adapted to permit continued movement thereof after the support is arrested by the stop means, a clamp for said support, and connections through which the continued movement of the driving member sets the clamp to hold the support at the position determined by the stop means.

5. In the combination defined in claim 4, a driving motor for said driving member and switch means operated by said continued movement of the driving member to deenergize the motor after the clamp is applied.

6. A mechanism comprising a rotatable support and indexing means therefor including a driving motor, a driving member operatively connecting said motor with the support for rotation thereof, an indexing cam on the support having a stop shoulder, a plunger yieldingly urged against said cam, and control means for the motor operable by movement of the plunger to reverse the motor when the stop shoulder is rotated past the plunger, whereby the support is rotated in reverse direction and said shoulder is driven against the plunger, stopping the reverse rotation of the support at indexing position.

7. A mechanism comprising a rotatable support and indexing means therefor including a driving motor, a driving member operatively connecting said motor with the support, an indexing cam on the support having a stop shoulder, a plunger yieldingly urged against said cam, a clamp to hold the support against rotation, and control means for the motor operable by movement of the plunger to reverse the motor when the stop shoulder is rotated past the plunger, whereby said shoulder is driven against the plunger, stopping the reverse rotation of the support at indexing position, said driving member being shiftable by continued reverse movement of the motor and connections by which the shifting of the driving member sets the clamp.

8. A mechanism comprising a rotatable support and indexing means therefor including a driving motor, a driving member operatively connecting said motor with the support, an indexing cam on the support having a stop shoulder, a plunger yieldingly urged against said cam, and control means for the motor operable by movement of the plunger to reverse the motor when the stop shoulder is rotated past the plunger, whereby said shoulder is driven against the plunger, stopping the reverse rotation of the support at indexing position, said driving member being shiftable by continued reverse movement of the motor, and switch means operable by the shifting of the driving member to deenergize the motor.

9. A mechanism comprising a rotatable support and indexing means therefor including a driving motor, drive gearing operatively connecting said motor with the support, a stop shoulder on the support, a movable stop member engageable therewith, control means to reverse the motor operable by movement of the stop member into position for engagement with the stop shoulder, said drive gearing including a shiftable member and spring means holding it in normal position, the reverse movement of the motor serving to drive the stop shoulder against the stop member and then operating to shift said member of the drive gearing in opposition to said spring means whereby the force of the spring acts in a direction to hold said shoulder against the stop.

10. A mechanism comprising a rotatable support and indexing means therefor including a driving motor, drive gearing operatively connecting said motor with the support, a stop shoulder on the support, a movable stop member engageable therewith, control means to reverse the motor operable by movement of the stop member into position for engagement with the stop shoulder, said drive gearing including a worm gear and a driving worm meshed therewith, a thrust bearing for the worm and a spring yieldingly supporting said bearing and holding the worm in normal driving position, the reverse movement of the motor serving to engage the stop shoulder with the stop member and continued reverse movement operating to feed the worm axially, compressing the spring and applying the force thereof through the worm gear to hold said shoulder against the stop.

11. A mechanism comprising a rotatable support and indexing means therefor including a driving motor, a worm gear, a driving worm meshed therewith, means yieldingly supporting the worm to permit longitudinal movement thereof, a stop shoulder on the support, a stop member engageable therewith, clamp means for the support and means operable by the longitudinal movement of the worm after engagement of the stop by the stop shoulder and serving to apply the clamp to the support.

12. A mechanism comprising a rotatable support and indexing means therefor including a driving motor, a worm gear, a driving worm meshed therewith, means yieldingly supporting the worm to permit longitudinal movement thereof, a stop shoulder on the support, a stop member engageable therewith, clamp means for the support and switch means operable by the longitudinal movement of the worm after arrest of the support by engagement of the stop shoulder with the stop, said switch means serving to stop the motor.

13. A mechanism comprising a rotatable support and indexing means therefor including a driving motor, a driving member operatively connecting said motor with the support, an indexing cam on the support having a plurality of stop shoulders at intervals, each of said shoulders corresponding to an indexing position, each shoulder being preceded by a high portion of the cam and followed by a low portion, with an inclined portion leading to the next high point, a plunger yieldingly engaging said cam, and control means for the motor operable to first effect a forward movement of the motor with said plunger engaging a low portion and then a succeeding inclined and high portion of the cam and thereafter dropping from the high portion to the next low portion, the drop of the plunger actuating said control means to reverse the motor and the support just after a stop shoulder of the cam has passed the plunger, whereby said shoulder is backed forcibly against the plunger, arresting the reverse movement of the support at indexing position.

14. In combination with a machine table having a reciprocatory cycle, an indexable support carried thereon, and means for indexing said support while the table reciprocates, said means including a driving motor, a driving member operatively connecting said motor with the support, an indexing cam on the support having a plurality of stop shoulders at intervals, each of said shoulders corresponding to an indexing position, each shoulder being preceded by a high portion of the cam and followed by a low portion, with an inclined portion leading to the next high point, a plunger yieldingly engaging said cam, and control means for the motor operable to first effect a forward movement of the motor with said plunger engaging a low portion and then a succeeding inclined and high portion of the cam and thereafter dropping from the high portion to the next low portion, the drop of the plunger actuating said control means to reverse the motor and the support just after a stop shoulder of the cam has passed the plunger, whereby said shoulder is backed forcibly against the plunger, arresting the reverse movement of the support at indexing position, a special portion of said cam between one pair of consecutive stop shoulders being formed to effect a greater displacement of the plunger in one direction than any other portion of the cam, the reciprocation of the machine table being electrically controlled, and switch means in the control circuit for the table operable by said displacement of the plunger to arrest the table each time said special portion of the cam is registered with the plunger.

15. In a milling machine, in combination with a reciprocatory table, an indexable work support carried by the table, said table having a cycle of movement comprising the approach to the cutter, the feeding movement in which the cutter operates, and a return movement in which the work is withdrawn from the cutter, indexing means for the support including a reversible driving motor, a drive connection therefrom to rotate the support, switch means actuated by the table in its return movement after separation of the work from the cutter and effective to initiate a forward movement of said driving member and support, switch means controlled by the forward movement of the support and operative to reverse the direction of movement of the support and the driving motor, stop means limiting the retrograde movement of said support, said drive connection including a yielding element which permits continued reverse movement of the motor after the arrest of the support, and switch means operated by said continued movement to deenergize the motor.

16. In a machine in which a tool element and a work element are arranged for reciprocation of one relative to the other, an indexable support for one of said elements, a slide or table which carries said support and has a cycle of movement comprising the approach of the tool and work, the feeding movement in which the tool operates upon the work, and a return movement by which the tool and work are separated, and indexing means for the support including a reversible driving motor, a drive connection therefrom to rotate the support, switch means actuated by the slide in its return movement after separation of the tool and work and effective to initiate a forward movement of said driving member and support, switch means controlled by the forward movement of the support and operative to reverse the direction of movement of the support and the driving motor, stop means limiting the retrograde movement of said support, said drive connection including a yielding element which permits continued reverse movement of the motor after the arrest of the support, and switch means operated by said continued movement to deenergize the motor.

17. In a machine in which a tool element and a work element are arranged for reciprocation of one relative to the other, an indexable support for one of said elements, a slide or table which carries said support and has a cycle of movement comprising the approach of the tool and work, the feeding movement in which the tool operates upon the work, and a return movement by which the tool and work are separated, and indexing means for the support including a reversible driving motor, a drive connection therefrom to rotate the support, switch means actuated by the slide in its return movement after separation of the tool and work and effective to initiate a forward movement of said driving member and support, switch means controlled by the forward movement of the support and operative to reverse the direction of movement of the support and the driving motor, stop means limiting the retrograde movement of said support, said drive connection including a yielding element which permits continuous reverse movement of the motor after the arrest of the support, and switch means operated by said continued movement to deenergize the motor, the reciprocation of said slide or table being electrically controlled and its control circuit including a pair of switches in parallel, one of which is normally closed as an incident to the completion of each indexing cycle of the support, and means by which the slide momentarily opens the other of said switches in its approach movement, whereupon its control circuit is broken and the slide is arrested if the indexing movement is still uncompleted.

BENGT R. GRANBERG.
ALFRED G. ERICSON.